United States Patent
Hull

(10) Patent No.: US 8,640,435 B1
(45) Date of Patent: Feb. 4, 2014

(54) SYSTEM AND METHOD FOR FABRICATION OF FIBERS USING LINKS OF NANOTUBES

(71) Applicant: The Boeing Company, Chicago, IL (US)

(72) Inventor: John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/765,187

(22) Filed: Feb. 12, 2013

(51) Int. Cl.
 *F16G 13/02* (2006.01)
 *B21L 7/00* (2006.01)

(52) U.S. Cl.
 USPC ........... 59/35.1; 59/78; 59/80; 59/93; 59/900; 252/510; 264/172.19; 264/335; 427/248.1; 427/249.1; 428/408

(58) Field of Classification Search
 USPC ............. 59/78, 78.1, 80, 93, 35.1, 900; 264/172.19, 335; 252/510, 511; 427/248, 248.1, 249; 428/408, 446
 See application file for complete search history.

(56) References Cited

U.S. PATENT DOCUMENTS 8,397,479 B2 * 3/2013 Wendig et al. ................ 59/78.1
8,454,803 B2 * 6/2013 Medoff .................... 204/157.63

OTHER PUBLICATIONS

Lepró et al., "Spinnable carbon nanotube forests grown on thin, flexible metallic substrates," Carbon, vol. 48, Issue 12, Oct. 2010, pp. 3621-3627.
Qian et al., "Load transfer mechanism in carbon nanotube ropes," Composites Science and Technology, vol. 63, Issue 11, Aug. 2003, pp. 1561-1569.

* cited by examiner

*Primary Examiner* — David B Jones
(74) *Attorney, Agent, or Firm* — Yee & Associates, P.C.

(57) ABSTRACT

Fabrication of fibers using links of nanotubes including slicing a first nanotube rope from a nanotube forest. The method further includes wrapping the first nanotube rope in a first plurality of circuitous turns to create a first link. The method further includes slicing a second nanotube rope from the nanotube forest. The method further includes wrapping the second nanotube rope in a second plurality of circuitous turns to create a second link, wherein the second link is interconnected to the first link in a chain.

20 Claims, 10 Drawing Sheets

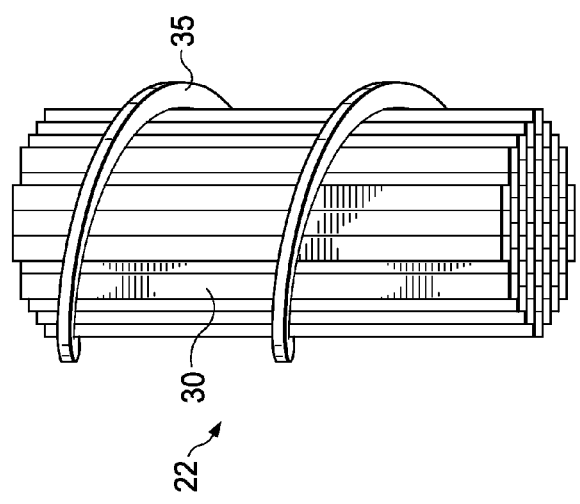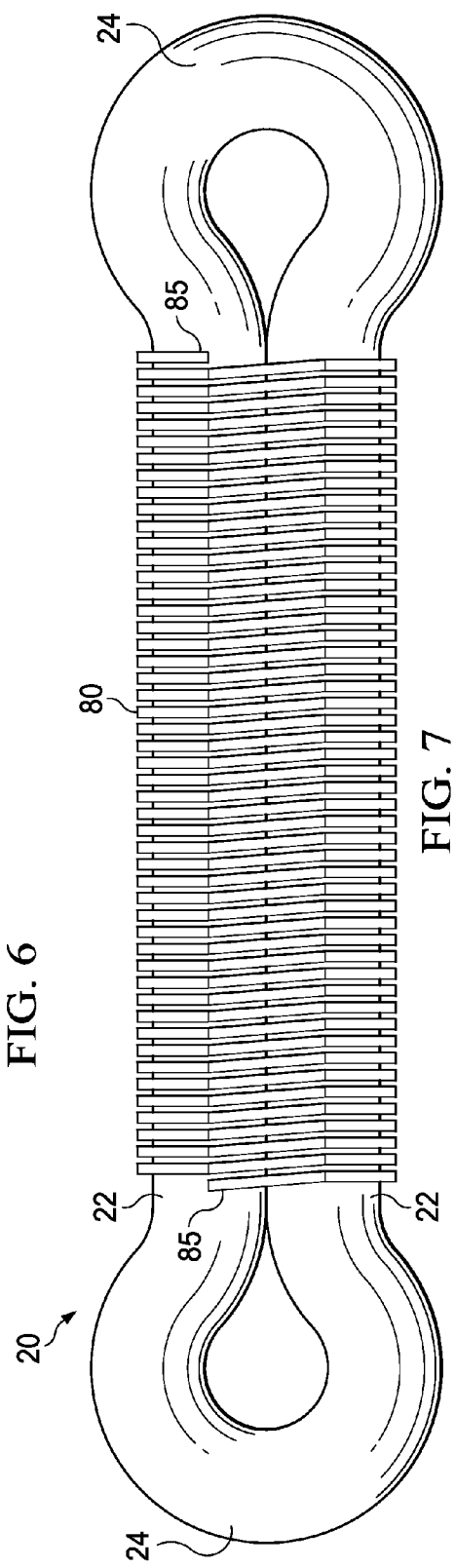

SYSTEM AND METHOD FOR FABRICATION OF FIBERS USING LINKS OF NANOTUBES

BACKGROUND INFORMATION

1. Field

The present disclosure relates generally to composite materials in which numerous fibers are embedded in a matrix material such as a polymer and, in particular, to a system and method for fabrication of fibers using bundles of carbon nanotubes formed into circuitous links interconnected sequentially in a chain.

2. Background

Carbon nanotubes are carbon fibers with a cylindrical nanostructure. Carbon nanotubes may be smaller in diameter than conventional carbon fibers. Carbon nanotubes are known to be strong and have high modulus relative to many other materials, particularly other kinds of carbon fibers. Conventional carbon fibers used in composite materials may be about ten microns in diameter and many meters in length. Carbon nanotubes may be one to ten nanometers in diameter (up to 10,000 times narrower than conventional carbon fibers) with a length of about one centimeter. However, the tensile strength of an individual carbon nanotube is greater than the tensile strength of an individual conventional carbon fiber.

Fibers similar to those used in commercial composites have not been produced from a plurality of carbon nanotubes. Thus, capturing the strength of individual carbon nanotubes in structures longer than individually grown carbon nanotubes has presented a continuing challenge.

Accordingly, it would be beneficial to have a method and apparatus that takes into account one or more of the issues discussed above as well as possibly other issues.

SUMMARY

The illustrative embodiments provide for a method. The method includes slicing a first nanotube rope from a nanotube forest. The method also includes wrapping the first nanotube rope in a first plurality of circuitous turns to create a first link. The method further includes slicing a second nanotube rope from the nanotube forest. The method further includes wrapping the second nanotube rope in a second plurality of circuitous turns to create a second link. The second link is interconnected to the first link in a chain.

The illustrative embodiments also provide for a system. The system may include a micromanipulator configured to cut an incision at a top of a nanotube forest to separate a first portion of a nanotube bundle from the nanotube forest. The micromanipulator is also configured to affix a first handling band around the first portion of the nanotube bundle. The micromanipulator is also configured to grip the first handling band and pull the nanotube bundle away from the nanotube forest. The micromanipulator is also configured to affix a second handling band around a second portion of the nanotube bundle. The second handling band is about opposite the first handling band. The second portion is about opposite the first portion of the nanotube bundle. The micromanipulator is also configured to move the nanotube bundle to a winding station.

The system also may include a reeling fixture of the winding station. The reeling fixture is configured to receive the nanotube bundle. The reeling fixture is further configured to position a first saddle inside a first closed nanotube link at a first end of the first closed nanotube link. The reeling fixture is further configured to affix a second end of the nanotube bundle to a starting slot of a second saddle. The reeling fixture is further configured to rotate the nanotube bundle about the first saddle using the second saddle and a third saddle. Rotation creates a circuitous loop from the nanotube bundle. The result is a second closed nanotube link. The second closed nanotube link is interlocked in a chain with the first closed nanotube link.

The illustrative embodiments also provide for an object. The object may include a first nanotube rope wrapped in a first plurality of circuitous turns to create a first link. The object also may include a second nanotube rope wrapped in a second plurality of circuitous turns to create a second link. The second link is interconnected to the first link in a chain.

The features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a short segment of a straight side of a carbon nanotube link, in accordance with an illustrative embodiment;

FIG. 7 is an illustration of straight sides of a carbon nanotube link in a wrapped and bound state, in accordance with an illustrative embodiment;

DETAILED DESCRIPTION

Figure 1:
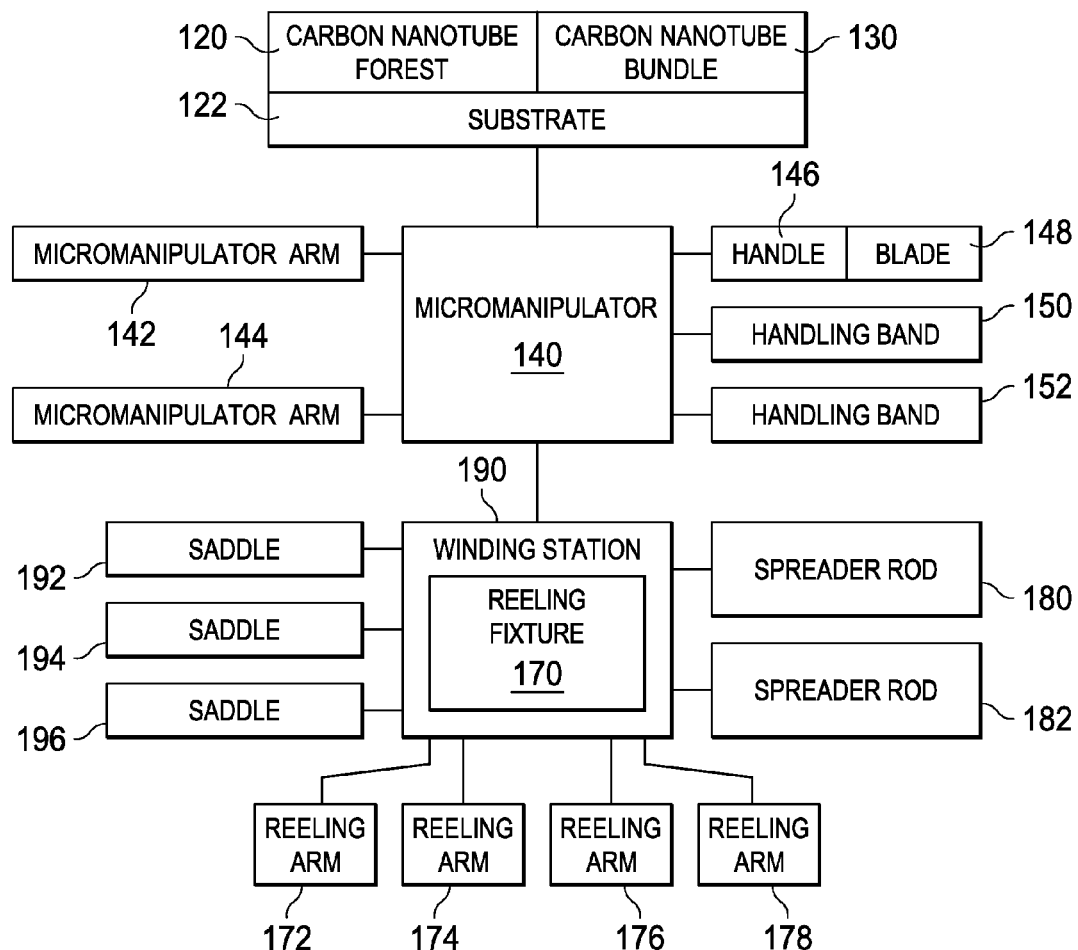
FIG. 1 is a block diagram of a system for fabrication of fibers using links of carbon nanotubes, in accordance with an illustrative embodiment.

One known method of creating carbon nanotubes is to grow them on a substrate that has a catalyst on its surface. A forest of carbon nanotubes may grow perpendicular to the surface of the substrate, similar to trees growing from the ground. Such a forest may include individual carbon nanotubes that are up to ten nanometers in diameter and spaced about five to twenty nanometers apart, center to center. The length of the carbon nanotubes, or the height of the forest, may be about one centimeter. Adjacent carbon fiber nanotubes may be bound to each other by van der Waals forces and align themselves into "ropes" held together by these forces. While van der Waals forces may be strong enough to keep carbon nanotubes together when the carbon nanotubes are bundled, these forces may not be strong enough to create a composite wherein stress is transferred from one carbon nanotube to adjacent carbon nanotubes.

Another known method of producing carbon nanotubes is placing carbon nanotubes in a matrix material, such as an epoxy or other known polymers, as is done with present fiber composites that use conventional carbon fibers. With known composites, a diameter of a fiber may be larger than a diameter of a matrix polymer molecule. This technique may be used to create a large volume fraction of fibers, for example 65%. Larger volume fractions may be obtained if non-circular fibers are used or if fibers with smaller diameters are interleaved with the larger diameter fibers. Whether non-circular fibers or interleaved smaller diameter fibers are used, there may be sufficient space between the fibers for polymer matrix material. The polymer matrix material may bond to the fibers and transfer stress from one fiber to an adjacent fiber over a length along the adjacent fiber that may be equivalent to many fiber diameters. These stresses may be undesirable.

Challenges have been encountered in attempting to use carbon nanotubes in geometries, such as discussed above. For example, the diameter of carbon nanotubes and the diameter of the polymer molecule may be similar, presenting difficulties in achieving an acceptably high volume fraction of carbon nanotubes. Such difficulties may prevent the polymer from maintaining contact with an acceptable fraction of the outer surface of the carbon nanotube.

Such difficulties may even prevent the polymer from making contact with all of the carbon nanotubes. A carbon nanotube without attachment to a polymer may only transfer stress to an adjacent carbon nanotube by means of van der Waals forces. Van der Waals forces may be significantly weaker than chemical bonds between polymers, as well as traditional fibers, and may be far weaker than the intrinsic strength of a carbon nanotube. Also, reliance on Van der Waal forces may require that surfaces of two fibers be close together.

Another challenge faced when attempting to build large structures from carbon nanotubes is that the polymer may not make an acceptable bond with individual carbon nanotubes because the walls of carbon nanotubes are typically smooth and may not contain points for strong bonding to occur.

This challenge may be overcome by functionalizing carbon nanotubes. Functionalizing involves exposing carbon nanotubes to heat or reactive chemicals. Functionalizing creates disruptions in the walls of the carbon nanotubes where chemical bonding may occur. However, functionalizing carbon nanotubes may reduce the strength of the carbon nanotubes by compromising the cell wall of the carbon nanotubes.

Carbon nanotubes may be categorized as single-walled carbon nanotubes and multi-walled carbon nanotubes. Another challenge occurs when multi-walled carbon nanotubes are used. A multi-walled carbon nanotube may include a plurality of single-walled carbon nanotubes nested in a single structure. Within a multi-walled carbon nanotube, the single-walled carbon nanotubes nested therein may be connected by van der Waals forces between the walls of adjacent single-walled carbon nanotubes. The van der Waals forces may be weaker than the wall strength of an individual single-walled carbon nanotube. In the composite, assuming acceptable bonding exists between the polymer matrix and the outermost single-walled carbon nanotube of each multi-walled carbon nanotube, only the outermost single-walled carbon nanotube might contribute significant strength to the composite. The innermost single-walled carbon nanotubes of each multi-walled carbon nanotube may contribute little to the strength of the composite. This effect occurs because nothing attaches onto the innermost single-walled carbon nanotubes that may transfer stress to an adjacent fiber.

The illustrative embodiments recognize and take into account the issues described above with respect to commercially available fibers made from carbon nanotubes not having the strength of individual carbon nanotubes. The illustrative embodiments also recognize and take into account that creating structures from carbon nanotubes that are longer than one centimeter is very difficult and has, to date, failed.

Thus, the illustrative embodiments relate to systems, methods, and objects wherein bundles of carbon nanotubes, or nanotube ropes, are wrapped in circuitous loops to form links. Nanotube ropes may be twisted during creation of links. The links are made part of chains comprising a plurality of sequentially interlocked links of bundles of carbon nanotubes. The lengths of the chains made from the sequentially interlocked links of bundles of carbon nanotubes may be similar to the lengths of existing composite fibers yet may have the strength of individual carbon nanotubes. The chains of carbon nanotubes are strong when under tension. The chains may make near maximum use of the strength of all the carbon nanotubes in the chain.

The illustrative embodiments contemplate slicing bundles of carbon nanotubes from nanotube forests through the use of a micromanipulator. Handling bands may be placed about opposite ends of the bundles to hold the bundles together. The micromanipulator then may move the bundles to a winding station. At the winding station a reeling fixture may wind the bundle in a plurality of circuitous turns to create a loop or link and fuse each of the two loose ends of the bundle to the newly created link. In creating the new link, the winding fixture may wind the bundle through a previously created link so that the newly created link may be interconnected with the previously created link in a chain.

The illustrative embodiments also recognize and take into account that the micromanipulator may use a blade attached to a handle to create an incision in a carbon nanotube forest to begin separating the new bundle from the nanotube forest. The micromanipulator may pull the new bundle away from the nanotube forest and place the handling bands on opposite ends of the bundle. After providing the bundle to the winding station, the reeling fixture may place a first saddle inside an existing carbon nanotube link. The reeling fixture then may use a second saddle and a third saddle to rotate the carbon nanotube bundle in a circuitous, looping fashion through the existing carbon nanotube link. The reeling fixture may have extendable and retractable arms. The arms alternately may take hold of and release the second and third saddles as the saddles are rotated about the first saddle.

The illustrative embodiments further recognize that, even though individual carbon nanotubes are of relatively short length, fiber structures comprising a plurality of sequentially chained nanotube links may be created. The chained nanotube links may be of length similar to non-nanotube fibers, yet may have about the strength of individual nanotubes. The strength of the carbon nanotubes may be maintained when the chain is under tension and pulled tight. The straight sections of carbon nanotube links may be wrapped by carbon nanotube bundles, further strengthening the wrapped links and the overall chain. Individual chains of nanotube links may also be placed adjacently or side by side and bound together. This arrangement may produce a thicker and stronger overall structure.

The illustrative embodiments further recognize that there may be little significant slippage between adjacent carbon nanotubes in the present invention, as would be the case if carbon nanotubes were drawn into a yarn. If multi-walled carbon nanotubes are used, the inner carbon nanotubes may contribute equally to the strength of the resulting chain.

The radius of curvature of the link ends of carbon nanotubes may be sufficiently large, compared to an individual carbon nanotube diameter, such that negligible degradation of the carbon nanotube strength may occur in traversing link ends. At the same time, the radius of curvature of link ends may be small relative to the length of links, so that most of the carbon nanotube material is used in the axial direction of the fiber.

The illustrative embodiments further recognize that the volume fraction of carbon nanotube in the composite may be high. The volume fraction may be as high as that of carbon fiber in a conventional composite. The geometry of the carbon nanotube may allow for ample space between adjacent chains in the composite, so that stresses can be transferred from chain to chain through the matrix material in essentially the same way as in a conventional fiber composite material. Within the interior of each link, the volume fraction of carbon nanotube may be about 100% and might not need to be diluted by matrix material.

The illustrative embodiments also recognize that, if the length of the carbon nanotube link is sufficiently long, the shear force between adjacent carbon nanotubes may be equal to or larger than the tensile strength of the individual carbon nanotube. This feature may ensure that the stress from one carbon nanotube is transmitted to adjacent carbon nanotubes over the length of the link. The shear force may be kept close to the maximum possible shear force by twisting the carbon nanotube bundle as the link is formed, and by overwrapping the outside of the link to keep the surfaces of adjacent carbon nanotubes close together.

Attention is now turned to the figures. FIG. 1 is a block diagram of system 100 of fabrication of fibers using links of carbon nanotubes is depicted in accordance with an illustrative embodiment. System 100 shown in FIG. 1 includes micromanipulator 140. Micromanipulator 140 may be a robot with multiple mechanical appendages or micromanipulator arms that have multiple degrees of freedom. Micromanipulator 140 may be used in conjunction with a microscope (not shown). A microscope may allow a desired level of precision of movement given the small size of carbon nanotubes. Micromanipulator 140 may operate with position resolution of a micron or less, and have an ability to identify locations of parts and geometric edges of the parts to at least the same resolution.

Micromanipulator arm 142 and micromanipulator arm 144 may be appendages attached to and controlled by micromanipulator 140. Micromanipulator arm 142 and micromanipulator arm 144 may include mechanisms that attach to, move, and release objects including carbon nanotube bundle 130 as described in detail hereinafter. Micromanipulator 140 also may include blade 148 that micromanipulator 140 uses to make incisions in a carbon nanotube forest 120 and to cut out from carbon nanotube forest 120 at least one carbon nanotube bundle 130. Blade 148 may be attached to micromanipulator 140 via handle 146.

Carbon nanotube forest 120 may be a cluster of carbon nanotubes grown on substrate 122 using chemical vapor deposition techniques or other well-known techniques. Carbon nanotubes grow in a perpendicular direction from the surface of substrate 122. Carbon nanotube bundle 130 is sliced from carbon nanotube forest 120 by blade 148. While carbon nanotube bundle 130 is depicted in FIG. 1 as part of carbon nanotube forest 120, once blade 148 completes its cutting action and micromanipulator 140 pulls the cut portion of carbon nanotube forest 120 away to form carbon nanotube bundle 130, carbon nanotube bundle 130 is no longer part of carbon nanotube forest 120. Carbon nanotube bundle 130 may be referred to henceforth as bundle 130.

Micromanipulator 140 also may include handling band 150 and handling band 152. As noted, van der Waals forces may not be strong enough to hold a plurality of carbon nanotubes together in a bundle that would withstand demands of commercial application. Micromanipulator arm 142 and micromanipulator arm 144 may affix handling band 150 and handling band 152 about carbon nanotube bundle 130 to keep component carbon nanotubes coherently together in carbon nanotube bundle 130. This action may take place as carbon nanotube bundle 130 is separated from carbon nanotube forest 120.

System 100 also may include reeling fixture 170. Reeling fixture 170 may be situated at winding station 190. Winding station 190 may receive carbon nanotube bundle 130 after carbon nanotube bundle 130 has been created by micromanipulator 140 via the cutting and bundling action described herein. Reeling fixture 170 may hold carbon nanotube bundle 130 and rotate carbon nanotube bundle 130 in a circuitous and looping fashion through an existing link made earlier from another carbon nanotube bundle 130.

Reeling fixture 170 may include saddle 192, saddle 194, and saddle 196. Saddle 194 may be placed inside an existing closed carbon nanotube link in a position that assists in holding open the existing closed carbon nanotube link. The existing closed carbon nanotube link may have the newly created carbon nanotube link wound through it to form a chain. Saddle 194 also may provide a concave space to hold the fiber of carbon nanotube bundle 130 as carbon nanotube bundle 130 is circuitously rotated or looped through the existing closed carbon nanotube link. Saddle 192 and saddle 196 may hold carbon nanotube bundle 130 as carbon nanotube bundle 130 is being rotated around and through the existing closed carbon nanotube link.

Figure 11:
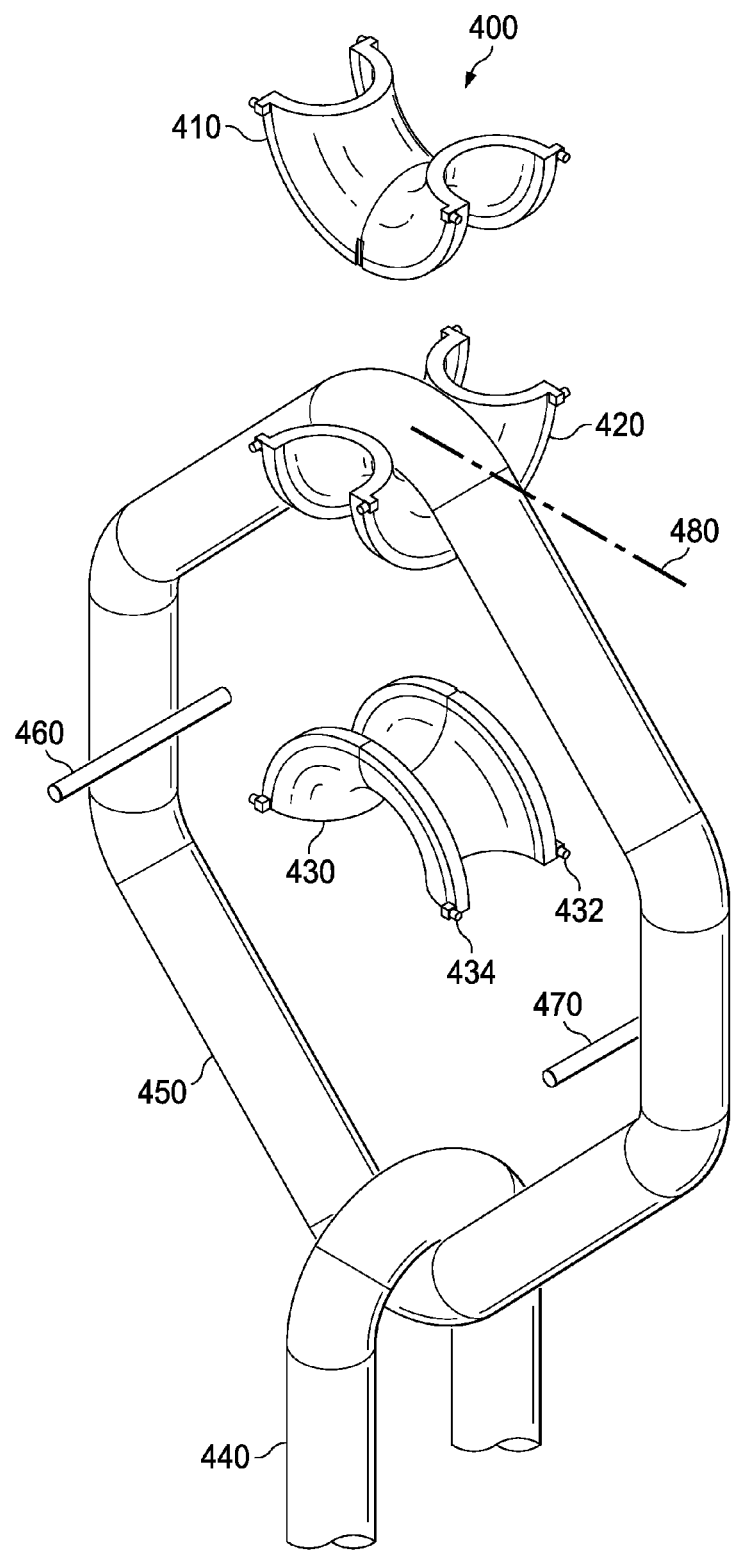
FIG. 11 is an illustration of geometries for a reeling method, in accordance with an illustrative embodiment.
Figure 12:
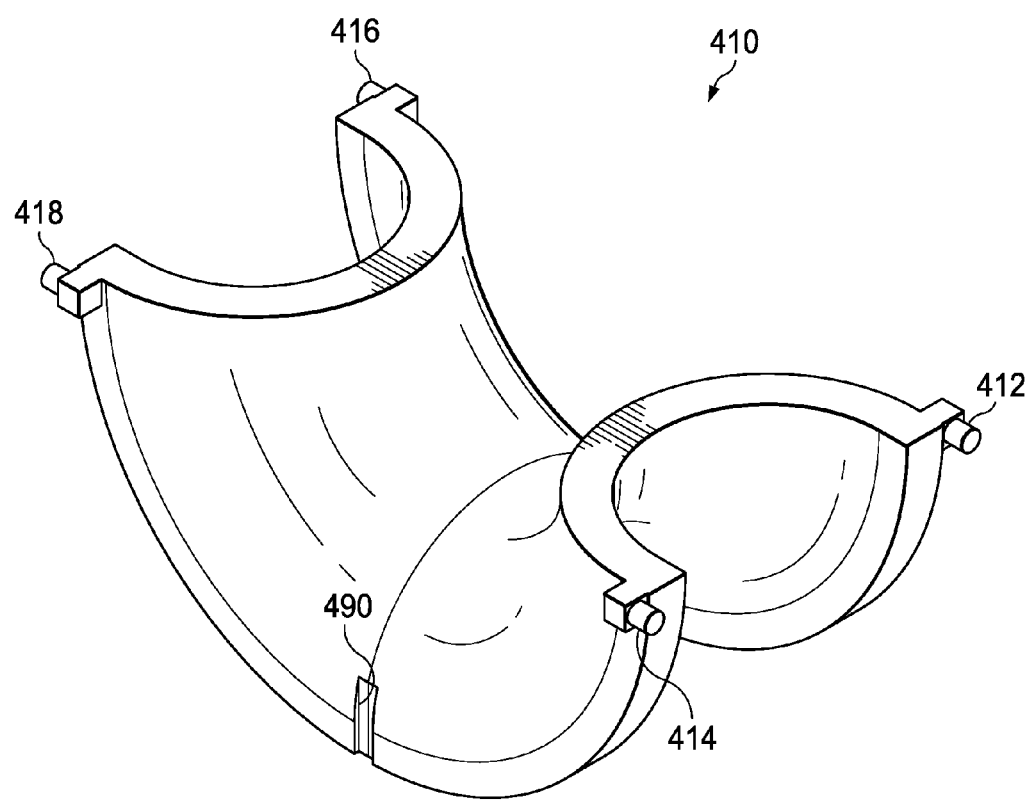
FIG. 12 is an illustration of another geometry for the reeling method, in accordance with an illustrative embodiment.

Reeling fixture 170 alternately may affix and release saddle 192 and saddle 196 during rotation of carbon nanotube bundle 130. Saddle 192 and saddle 196 each may have four saddle handles, though different numbers of handles may be present. Handles attached to saddle 194 and saddle 196 are depicted in FIG. 11, as one non-limiting illustrative embodiment. Handles attached to saddle 192 are depicted in FIG. 12, as another non-limiting illustrative embodiment.

Reeling fixture 170 may have reeling arm 172, reeling arm 174, reeling arm 176, and reeling arm 178. Each of these reeling arms may be extendable and retractable. At the end of each of reeling arm 172, reeling arm 174, reeling arm 176, and reeling arm 178 may be a fixture (not shown) that takes hold of and releases handles attached to saddle 192 and handles of saddle 196. This take and release action may be performed as saddle 192 and saddle 196 are rotated about saddle 194. Saddle 192, saddle 194, and saddle 196, their handles, and the process discussed herein are described in greater detail hereinafter in the discussion of FIG. 2 through FIG. 13.

Reeling fixture 170 also may have spreader rod 180 and spreader rod 182. Spreader rod 180 and spreader rod 182 along with saddle 194 collectively may hold open the existing closed carbon nanotube link while the reeling fixture 170 is using saddle 192 and saddle 196 to rotate carbon nanotube bundle 130 in a circuitous manner. This action may be used to create an interlocking carbon nanotube link.

Figure 2:
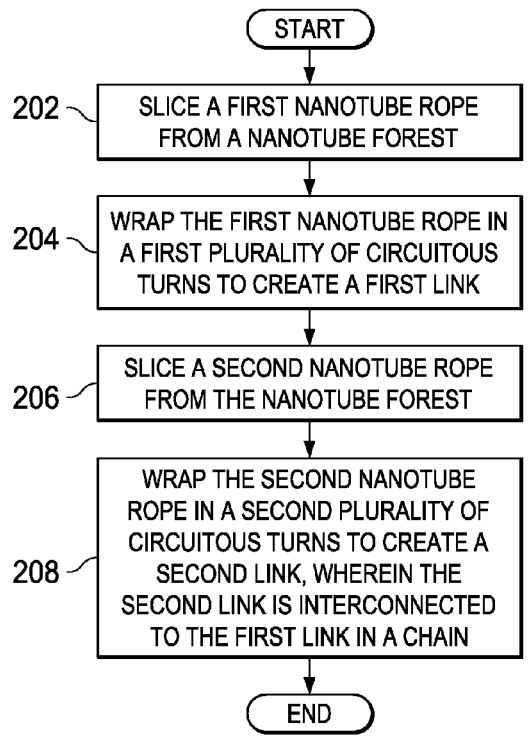
FIG. 2 is a flowchart depicting a method for fabrication of fibers using links of carbon nanotubes, in accordance with an illustrative embodiment.

FIG. 2 is an illustration of a block diagram of a method for fabrication of fibers using links of carbon nanotubes, in accordance with an illustrative embodiment. Method 200 shown in FIG. 2 may be implemented using system 100 of FIG. 1. The process depicted in FIG. 2 may be a variation of the processes discussed in connection with FIG. 1 and with FIG. 3 through FIG. 13. Although the operations presented in FIG. 2 are described as being performed by "a process," the operations may be performed using one or more physical devices, as described elsewhere herein.

Method 200 may begin as the process slices, using the blade 148 via handle 146 attached to micromanipulator 140, a first nanotube rope from the carbon nanotube forest 120 (operation 202). The process may then wrap, using reeling fixture 170, the first nanotube rope in a first plurality of circuitous turns to create a first link (operation 204). The process may then slice, using the blade 148, a second nanotube rope from the carbon nanotube forest 120 (operation 206). The process may then wrap, using the reeling fixture 170, the second nanotube rope in a second plurality of circuitous turns to create a second link, wherein the second link is interconnected to the first link in a chain (operation 208).

The process shown in FIG. 2 is exemplary only. The process may be varied, both in terms of the number of operations as well as in terms of what devices are used to carry out the operations. For example, more or different blades, handles, and reeling fixtures may be used. Thus, the claimed inventions are not necessarily limited by the operations described in FIG. 2.

Figure 3:
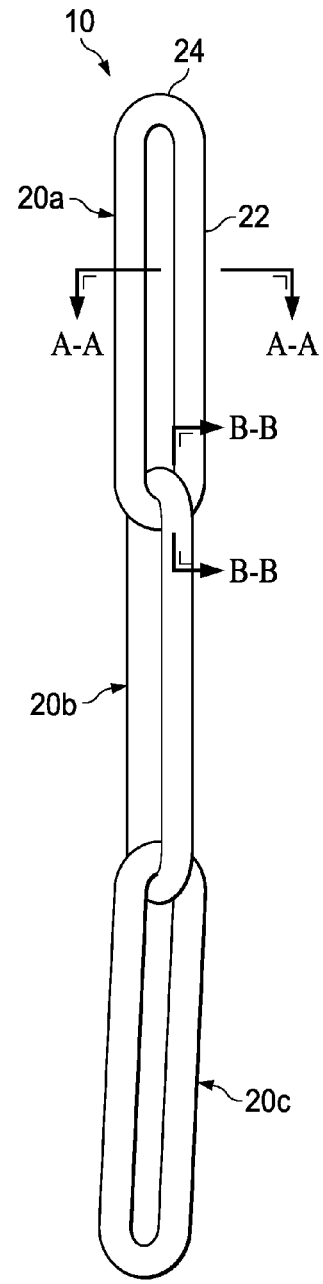
FIG. 3 is an illustration of a geometry of carbon nanotube fibers, in accordance with an illustrative embodiment.

FIG. 3 depicts chain 10 of carbon nanotube fibers, in accordance with an illustrative embodiment. Chain 10 depicted in FIG. 3 may be a chain constructed using the system of FIG. 1 and using the operations of method 200. Chain 10 of carbon nanotube fibers depicted in FIG. 3 may be a vertical chain of three links made from carbon nanotube bundles using the system of FIG. 1 and using the operations of method 200. While FIG. 3 depicts a chain of three carbon nanotube links, a chain may include two carbon nanotube links or may include four or more carbon nanotube links.

In an illustrative embodiment, the chain depicted in FIG. 3 may include three links, link 20a, link 20b, and link 20c. While link 20a, link 20b, and link 20c may appear in FIG. 3 to share identical length, width, and other physical characteristics, in an embodiment link 20a, link 20b, and link 20c do not share like identical physical characteristics.

Link 20a in FIG. 3 is depicted with component parts that are characteristic of the like component parts in link 20b and link 20c. For discussion purposes, description herein of link 20a may apply to link 20b and link 20c. For discussion purposes and ease of presentation, when characteristics common to link 20a, link 20b, and link 20c are being discussed, they may be referred to collectively as link 20.

Each of link 20a, link 20b, and link 20c may include two straight section 22 and two end sections 24. Each of link 20a, link 20b, and link 20c may include a plurality of circuitous turns of carbon nanotube bundle 130.

Figure 4:
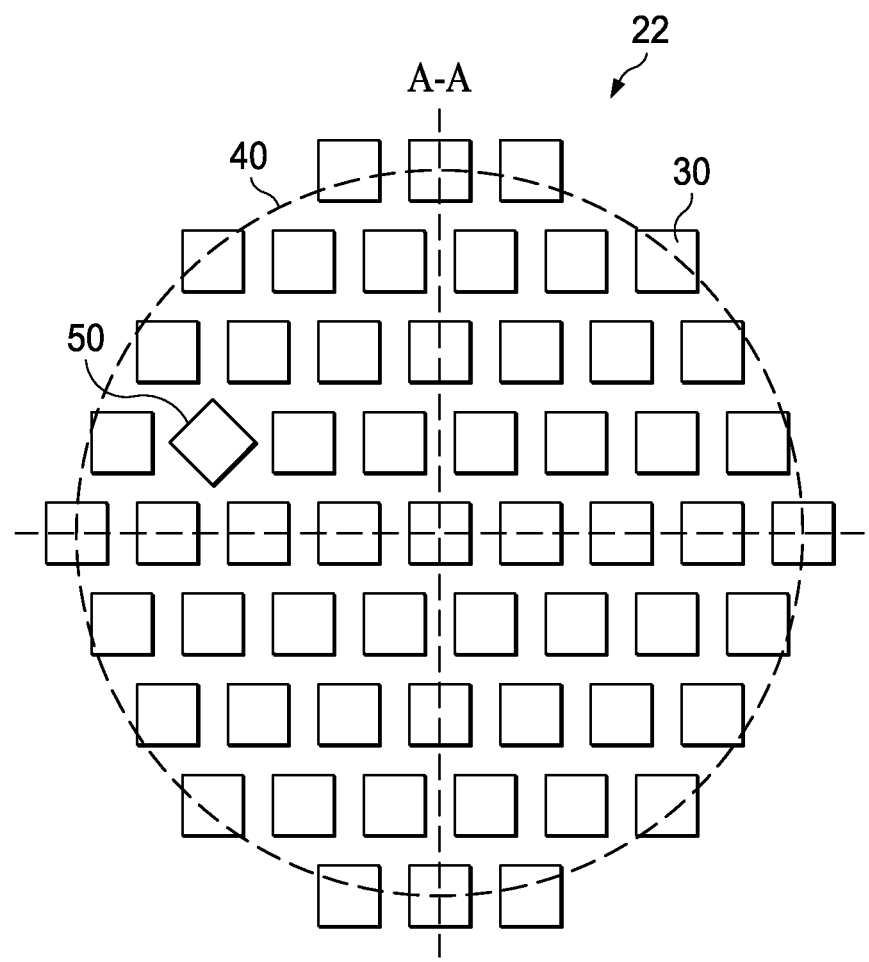
FIG. 4 is an illustration of another geometry of a carbon nanotube fiber, in accordance with an illustrative embodiment.
Figure 5:
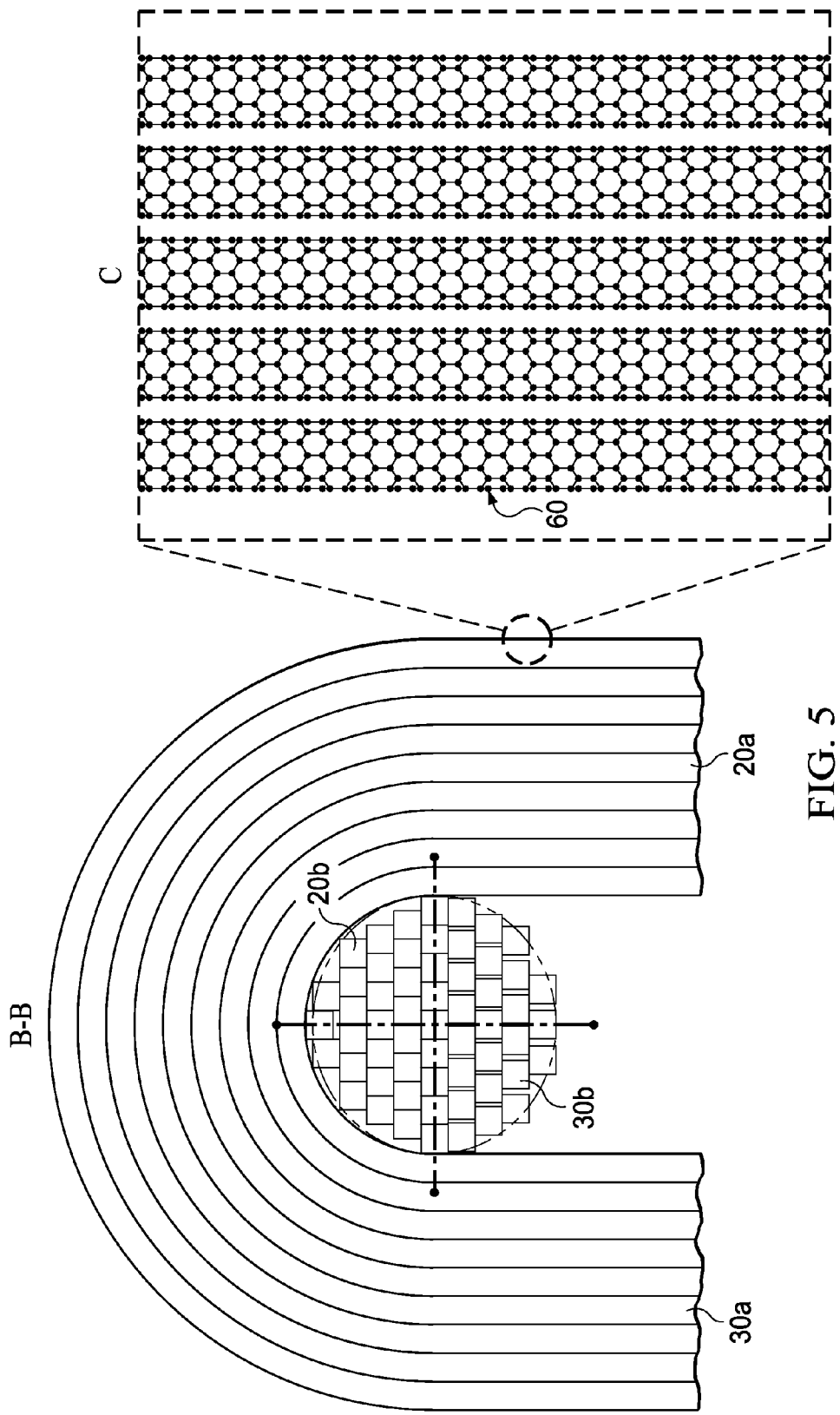
FIG. 5 is an illustration of another geometry of a carbon nanotube fiber, in accordance with an illustrative embodiment.

The labels A-A and B-B refer to cross-sectional views of link 20a. Cross sectional view A-A is depicted in FIG. 4, which is an illustration of another geometry of a carbon nanotube fiber, and depicts a view of a cross section 40 of straight section 22 of link 20a. Cross sectional view B-B is depicted in FIG. 5, which is an illustration of another geometry of a carbon nanotube fiber, and depicts a cross sectional view of the end sections 24 of link 20a.

As noted, carbon nanotube links as produced by components of the system 100, and of which link 20 is an embodiment, may be the product of a plurality of circuitous turns of a carbon nanotube bundle, such as bundle 130 of FIG. 1. Each square in cross sectional view A-A may be a segment of carbon nanotube bundle 130, represented also as bundle 130 in FIG. 4, as bundle 130 has undergone a circuitous turn.

As shown in circular cross section 40 in cross sectional view A-A of FIG. 4, straight section 22 may include a plurality of turns of carbon nanotube bundle 130. At a given point of circular cross section 40, one or more segments of the bundle 130 may be undergoing a twist about its longitudinal axis, as illustrated by bundle segment 50 in FIG. 4.

Because the carbon nanotube bundle 130 may be wrapped in a circular, an ovular, or a racetrack form, the outermost portion of a turn of carbon nanotube bundle 130 may travel further than the innermost part of the turn of carbon nanotube bundle 130. With an end of carbon nanotube bundle 130 fixed where winding of carbon nanotube bundle 130 begins, the outermost portion traveling further than the innermost portion may result in the innermost portion extending past the outermost part of the carbon nanotube bundle 130 at the far end.

This result may either make holding the far end difficult, or result in buckling of carbon nanotube bundle 130 at the point where carbon nanotube bundle 130 is held. Failure to hold, or buckling, may result in degrading cohesion of carbon nanotube bundle 130 or making handling of carbon nanotube bundle 130 more difficult.

In this embodiment, carbon nanotube bundle 130 may be given either a ninety degree rotation or one hundred eighty degree rotation about the longitudinal axis of carbon nanotube bundle 130 along each straight section 22 for each winding turn. Either of these two rotations may assist in mitigating buckling of carbon nanotube bundle 130. Either of these two rotations may also limit unevenness in travel from one side of carbon nanotube bundle 130 to either that occurring in a full turn or that occurring in a half turn.

Alternate strategies for twisting carbon nanotube bundle 130 during rotation by reeling fixture 170 may be available. A first such strategy may include twisting in one direction on one side of link 20 and twisting in the opposite direction on the other side of link 20. A second such strategy may include twisting periodically, but not necessarily every turn or every half turn.

As is depicted in cross sectional view B-B in FIG. 5, end sections 24 of adjacent links may be wrapped around each other when chain comprising link 20a and link 20b is under a modest amount of tension. FIG. 5 includes a cutout C depicting carbon nanotube bundle 130 formed by a collection of individual carbon nanotubes, depicted in FIG. 5 as carbon fiber nanotubes 60. The carbon fiber nanotubes 60 are grouped coherently as they are in carbon nanotube forest 120. Carbon fiber nanotubes 60 depicted in FIG. 5 are depicted as single-walled carbon nanotubes. In an embodiment, carbon fiber nanotubes 60 depicted in FIG. 5 may be single-walled carbon nanotubes.

In cross sectional view A-A, segments of carbon nanotube bundle 130 are not necessarily in close proximity to each other, while in cross sectional view B-B, segments of carbon nanotube bundle 130 may be in close proximity to each other. "Close proximity" may be defined as a distance at which the van der Waals force between adjacent carbon nanotubes at about the periphery of adjacent bundles is at least about 1% of the van der Waals force between adjacent carbon nanotubes within a bundle. This difference may arise because chain 10, depicted in FIG. 3, is depicted when chain 10 is under a modest amount of tension. When chain 10 is laid out to form a fiber, the tension may be increased, and spacing between segments in straight section 22 of link 20 may be decreased.

As an example size, carbon nanotube bundle 130 may be cut from carbon nanotube forest 120 in a rectangular, parallel piped format with a dimension of two microns by two microns by four centimeters. Link 20 may have a longitudinal dimension of one tenth to one millimeter, resulting in between two hundred and twenty turns. The transverse dimension of link 20 may be approximately thirty-five microns in a flat direction and fifty microns in the direction of the turn of the end of link 20. Carbon nanotube bundle 130 in this example would contain approximately 10,000 to 40,000 carbon nanotubes.

Carbon nanotube bundle 130 may have two ends, each of which is attached to link 20. If left unattached, link 20 might possibly unravel as chain 10 is stretched.

Thus, a means to attach the ends of carbon nanotube bundle 130 to link 20a is depicted in FIG. 6. FIG. 6 depicts a short segment of a straight side 22 of link 20. FIG. 6 depicts one of the ends of carbon nanotube bundle 130 as bundle end 35. Bundle end 35 in FIG. 6 may be wrapped around the turns of fiber of link 20. A thin layer of polymer may be applied over bundle end 35 and its surrounding area to keep bundle end 35 in place. The other free end (not shown) may be similarly attached to link 20a.

The shear strength of adhesion between a wrapped bundle end 35 and the remainder of the segments in link 20 may be small compared to the tensile strength of carbon nanotube bundle 130. However, the relatively long length of link 20 may create a larger contact area compared with cross sectional area of link 20. Further, total shear force across the entire wrapping of bundle end 35 may be sufficient to prevent bundle end 35 from unwinding. Alternatively, if link 20 is sufficiently long, van der Waals forces between the surface of bundle end 35 and an adjacent length of carbon nanotube bundle 130 may be sufficient to prevent unraveling, and bundle end 35 may be placed straight along link 20.

The illustrative embodiments also include wrapping straight section 22 of link 20 to improve compressive strength of link 20. Compressive strength of link 20 may be improved by keeping segments of carbon nanotube bundle 130 on each side of link 20 compact.

FIG. 7 depicts straight sides of link 20 in a wrapped and bound state, in accordance with an illustrative embodiment. The outside of link 20 depicted in FIG. 7 may be wrapped with additional nanotube ropes comprising at least one carbon nanotube bundle 130 or may be wrapped with loose ends of carbon nanotube bundle 130 used to create link 20. In FIG. 7, link 20 has exterior wrap 80 wrapped around straight section 22 of link 20. Pulling exterior wrap 80 tight may bring straight section 22 together. More than one carbon nanotube bundle 130, wound in either a parallel or series fashion, could be used to wrap link 20.

Because compression failure of link 20 may be due to a buckling instability of carbon nanotubes, material to increase compression strength might only be strong enough to prevent initiation of buckling. Since external wrap 80 need not be as strong as carbon nanotube bundle 130 used to create link 20, external wrap 80 may be made from functionalized carbon nanotube or carbon nanotube yarn. External wrap 80 made from functionalized carbon nanotube may improve the bonding of link 20 to matrix material when placed in a composite. As is the case with free ends of carbon nanotube bundle 130, free ends of exterior wrap 80, depicted in FIG. 7 as free ends 85, need to be attached to link 20 by polymer or other means. Alternatively, a long carbon nanotube yarn could be used to wrap link 20a, link 20b, and link 20c prior to attaching or could wrap link 20a, link 20b, and link 20c in adjacent fibers. Although wrapping depicted in FIG. 7 may increase compressive strength of link 20, link 20 itself may have the ability to pivot about end sections 24 of adjacent link 20, so buckling is still possible.

Referring back to FIG. 3 to illustrate adjacent links, link 20b may be depicted as between link 20a and link 20c. Link 20a and link 20c may be adjacent to link 20b. Buckling of any or all of 20a, link 20b, or link 20c can be caused by pivoting of their adjacent links. The wrapping depicted in FIG. 7 may draw end sections 24 tighter around end sections 24 of adjacent links. However, pivot movement may still be possible.

Figure 8:
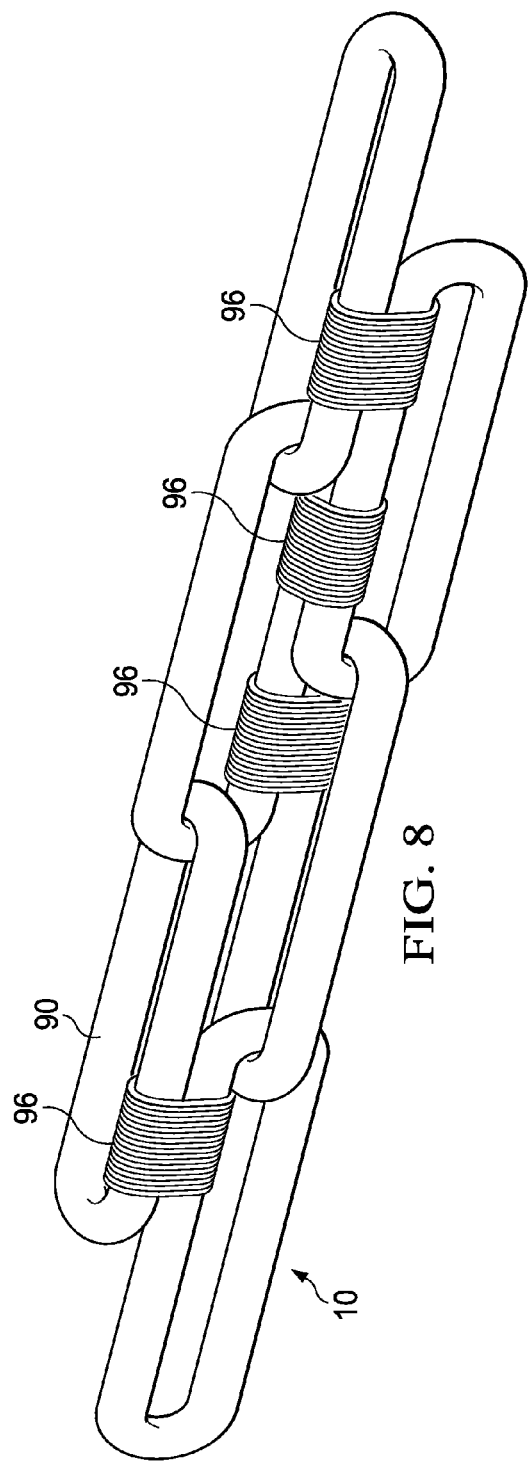
FIG. 8 is an illustration of carbon nanotube links of adjacent fibers coupled together, in accordance with an illustrative embodiment.

To decrease pivot tendency further, links of adjacent fibers could be coupled together, as depicted in FIG. 8. In FIG. 8, chain 10 and chain 90 run parallel to each other. Only three links of each of chain 10 and chain 90 are shown, however, more or fewer links may be present.

In an illustrative embodiment, chain 90 may be displaced one link leg diameter behind chain 10. Chain 90 may be displaced two link leg diameters behind chain 10. Chain 90 may be displaced half a link length axially from chain 10. Chain 10 and chain 90 may be bound by link wrappings 96 at locations where straight sides 22 are adjacent between chain 10 and chain 90. Link wrappings 96 may prevent each of chain 10 and chain 90 from pivoting at end sections 24. Pivoting might only be possible if straight side 22 of one of the links is bent. Chain 10 and chain 90, when coupled, would form a fiber that could have greater compressive strength than chain 10 alone or chain 90 alone. In an embodiment, a third chain or further chain (not shown) could be located relative to chain 90 similar to the manner in which chain 90 is located relative to chain 10. In this extended geometry, the set of chains that are connected by link wrappings may form a thin plane.

Two general methods may be used for fabricating fiber from link 20a, link 20b, and link 20c made from carbon nanotubes. A first method is a reeling method. A second method is a threading method. In both methods, the process may begin by harvesting a carbon nanotube bundle 130 from carbon nanotube forest 120. The process begins with micromanipulator blade 148 cutting an incision at the top of carbon nanotube forest to separate top of carbon nanotube bundle away from rest of carbon nanotube forest 120. Micromanipulator arm 142 then places handling band 150 around top of carbon nanotube bundle 130. Micromanipulator arm 142 then takes hold of handling band 150. Micromanipulator arm 142 then pulls carbon nanotube bundle 130 away from carbon nanotube forest 120. Micromanipulator arm 142 places handling band 150 around bottom of carbon nanotube bundle 130. Micromanipulator arm 142 moves carbon nanotube bundle 130 to winding station 190. Winding station 190 may then wind carbon nanotube bundle 130 as a link in a chain. The method described above may be varied, such as by adding or subtracting or modifying some operations.

Figure 9:
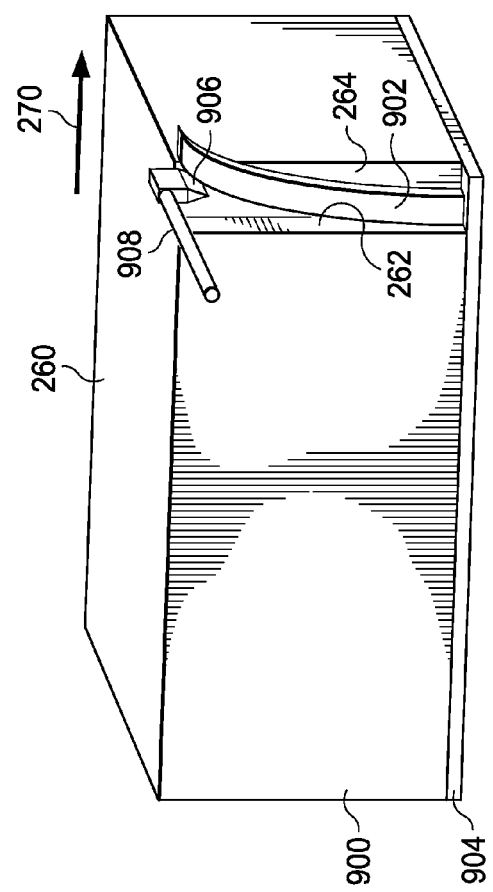
FIG. 9 is an illustration of a schematic of a carbon nanotube forest with separation of a carbon nanotube bundle from the carbon nanotube forest, in accordance with an illustrative embodiment.

FIG. 9 depicts a schematic of a carbon nanotube forest with separation of a carbon nanotube bundle from the carbon nanotube forest, in accordance with an illustrative embodiment. Carbon nanotube forest 900 may be carbon nanotube bundle 130 of FIG. 1. Carbon nanotube bundle 902 may be carbon nanotube bundle 130 of FIG. 1. Blade 906 may be blade 148 of FIG. 1. Handle 908 may be handle 146 of FIG. 1.

Substrate 904 may hold carbon nanotube forest 900 of carbon nanotube fibers. Carbon nanotube bundle 902 has been separated from carbon nanotube forest 900 by blade 906. Blade 906 may be connected to handle 908. Blade 906 may first make an incision along face 260 of carbon nanotube forest 900 on lines that define face 262 and face 264. Blade 906 may be lowered and moved in direction 270, which may be about perpendicular to face 262. The lowering and moving of blade 906 may bend the top of carbon nanotube bundle 130 away from the remainder of carbon nanotube forest 900.

Figure 10:
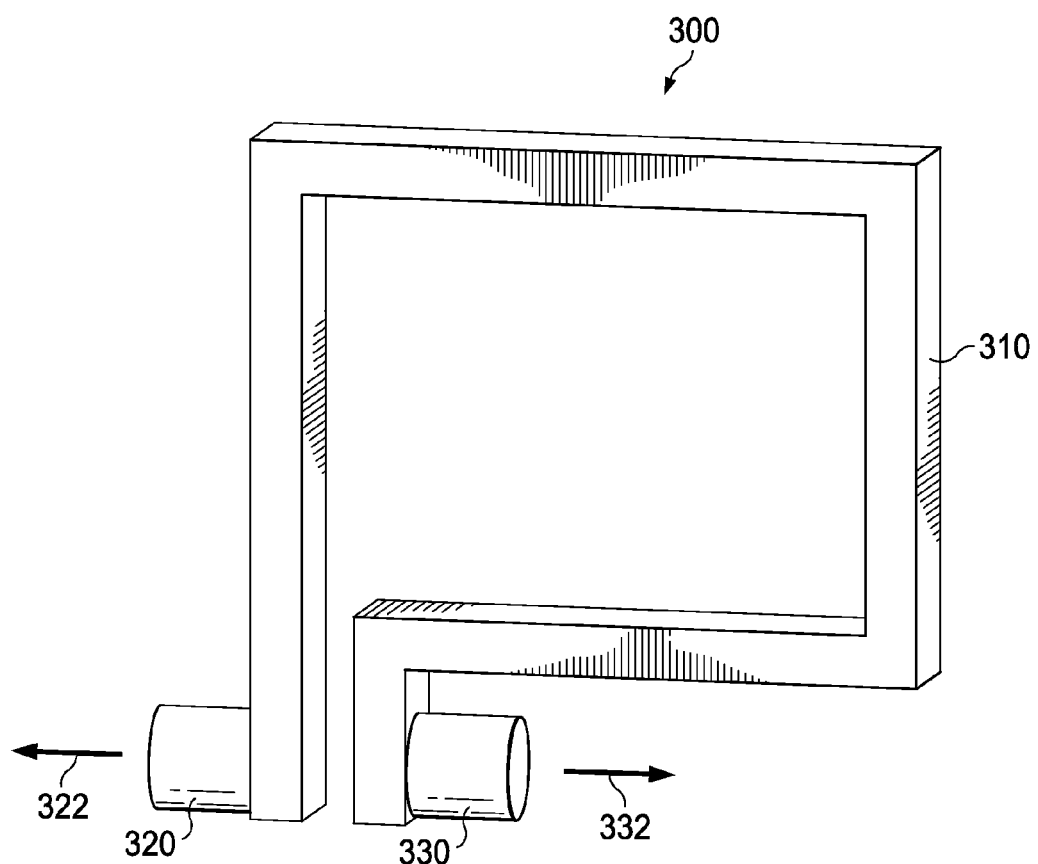
FIG. 10 is an illustration of a handling band, in accordance with an illustrative embodiment.

FIG. 10 depicts an embodiment of handling band 300 which corresponds to handling band 150 and handling band 152 of system 100 of FIG. 1. Handling band 300 may include band 310, band handle 320 and band handle 330. Band 310 may be made of a spring-like material, such as spring steel. Band 310 may be bent in such a configuration that when band 310 is in a relaxed state, as depicted in FIG. 10, band 310 may fit tightly about an end of carbon nanotube bundle 130. Band handle 320 and band handle 330 may be attached such that when band handle 320 and band handle 330 are pulled outward, that is in direction 322 and direction 332 in FIG. 10, band 310 expands to slip over an end of carbon nanotube bundle 130.

FIG. 11 depicts geometries for the reeling method, in accordance with an illustrative embodiment. In FIG. 11, existing links of a chain may have already been made from nanotube fibers extend downwardly relative to the top link shown, and a new link is intended to be built on top of an existing chain, such as chain 10 of FIG. 1.

FIG. 11 depicts reeling fixture 400 that may include saddle 410 (which may be saddle 192 of FIG. 1), saddle 420 (which may be saddle 194 of FIG. 1), and saddle 430 (which may be saddle 196 of FIG. 1). Thus, reeling fixture 400 may be analogous to reeling fixture 170 provided by system 100 of FIG. 1.

Unspread link 440 may be a link immediately below spread link 450. Spread link 450 may receive a newly interconnected link via the methods taught herein. Spread link 450 may be constrained at four points, though a different number of points may be used. The four points may be unspread link 440, saddle 420, spreader rod 460, and spreader rod 470.

In FIG. 12, which is an illustration of another geometry for the reeling method, a close-up view A of saddle 410 (which may be saddle 192 of FIG. 1) depicts saddle handle 412, saddle handle 414, saddle handle 416, and saddle handle 418. Saddle 410 may have a starting slot. For example, slot 490 may receive and hold a carbon fiber nanotube. For saddle 430 in FIG. 11, saddle handle 432 and saddle handle 434 may be labeled.

Reeling fixture 170 of system 100 of FIG. 1 may have reeling arm 172, reeling arm 174, reeling arm 176, and reeling arm 178 (all of FIG. 1) that extend and retract. At the end of each of reeling arm 172, reeling arm 174, reeling arm 176, and reeling arm 178 is a fixture (not shown) that takes hold of one handle of one of saddle 410. Reeling arm 172, reeling arm 174, reeling arm 176, and reeling arm 178 may be positioned so that they may take hold of saddle handle 412 and saddle handle 414 of reeling saddle 410 and may take hold of saddle handle 432 and saddle handle 434 of reeling saddle 410.

Reeling fixture 170 may rotate about center-line 480, which may be collinear with the axis of saddle 194. Viewing from the right side of FIG. 11 down center-line 480, the rotation would be clockwise. The lower part of carbon nanotube bundle 130 would be placed in starting slot 490 with handling band 150 at a lower end of carbon nanotube bundle 130 below starting slot 490. Saddle 410 may be oriented as shown in FIG. 11.

The rest of carbon nanotube bundle 130 may be moved behind saddle 410 that puts the carbon nanotube bundle 130 under a modest amount of tension. As reeling fixture 170 rotates, the distance between the upper end of carbon nanotube bundle 130 and saddle 410 may be allowed to decrease, keeping a constant tension.

In another illustrative embodiment, additional saddles may be present. For example, a second saddle, such as saddle 194 of FIG. 1, may help to align carbon nanotube bundle 130 as it winds around saddle 410 and the second saddle.

As reeling fixture 170 rotates, and the orientation is such that the portion of reeling fixture 170 holding saddle handle approaches spread link 450, reeling fixture 170 may change the saddle handle that it holds. For example, in the orientation of FIG. 11, reeling fixture 170 would be holding saddle handle 434. As part of the rotation, the rotational motion may stop briefly. In this case, one of reeling arm 172 and reeling arm 174 would extend and take hold of saddle handle 432. Once this handle is secure, saddle handle 434 would be released, and the reeling arm 172 or reeling arm 174 holding saddle handle 434 would be retracted. The rotational motion may then restart. A similar operation may occur after another half rotation when saddle 410 reaches the position between spread link 450. If the extension and retraction of reeling arm 172 and reeling arm 174 are fast enough, the rotational motion need not come to a full stop when the exchange of handle holding takes place.

The following is an outline of the reeling method described in the preceding paragraphs to produce one link 20 from carbon nanotube bundle 130. This outline is not necessarily limiting of the claimed inventions, and may be varied, such as described elsewhere herein.

1. Assemble saddle 192, saddle 194, and saddle 196, place saddle 192, saddle 194, and saddle 196 on reeling fixture 170, and position reeling fixture 170.
2. Place handling band 150 at lower end of carbon nanotube bundle 130 in starting slot 490 on saddle 192.
3. By moving handling band 152 at upper end of carbon nanotube bundle 130, rotate remainder of carbon nanotube bundle 130 over upper saddle.
4. Rotate reeling fixture 170 half turn.
5. Reeling fixture 170 grips adjacent handle on lower saddle and releases grip on first handle.
6. Insert one half or one quarter twist in orientation of carbon nanotube bundle 130.
7. Iterate steps 4 through 6 above until winding is complete.
8. Wind free end of carbon nanotube bundle 130 around the straight side 22 of link. Remove handling band 150 at top of carbon nanotube bundle 130, cut away excess, and move handling band away from link.
9. Disconnect handling band at bottom of carbon nanotube bundle 130 from starting slot 490, wrap end around other straight side 22 of link.
10. Apply polymer to fix ends.

Figure 13:
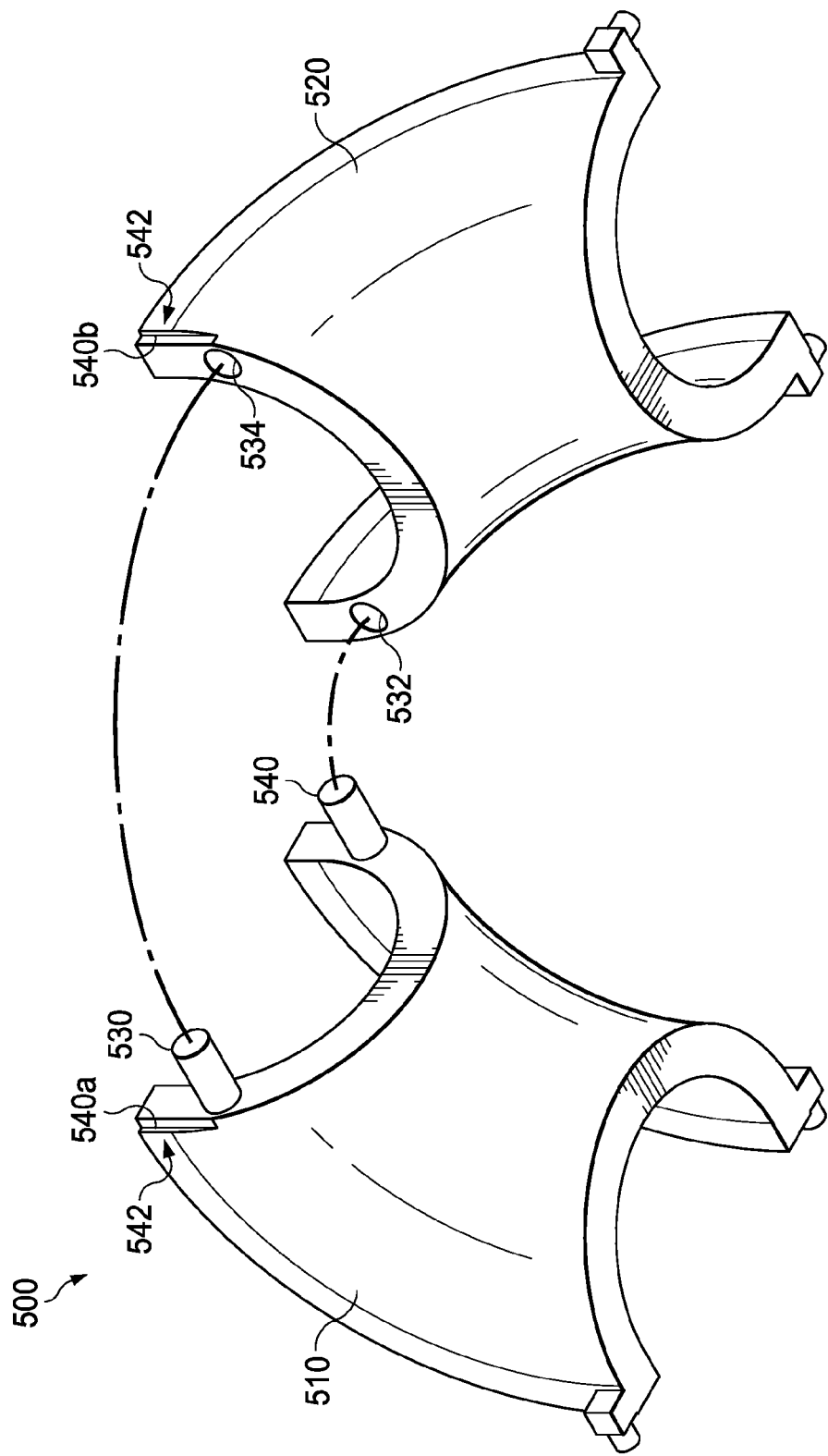
FIG. 13 is an illustration of removal of saddles from a wound carbon nanotube link, in accordance with an illustrative embodiment.

To facilitate removal of saddle 192, saddle 194, and saddle 196 from a wound link 20, saddle 192, saddle 194, and saddle 196 may be split down the middle and alignment pins used for assembly, as depicted in FIG. 13. In FIG. 13, which is an illustration of removal of saddles from a wound carbon nanotube link, saddle 500 may be formed by fitting together saddle half 510 and saddle half 520. Saddle half 520 may contain alignment pin 530 and alignment pin 540 that fit respectively into alignment hole 532 and alignment hole 534 in saddle half 520. Starting slot 542 may be formed by half slot 540a and half slot 540b. These arrangements may be varied, such as by varying the number of pins and holes, varying which saddle half has pins or holes, alternating pins and holes, using multiple saddle pieces, using asymmetrically sectioned saddle pieces, and many other alternatives. Thus, the above description is not necessarily limiting of the claimed inventions.

An alternative method to the reeling method is a threading method. A threading method may use the basic geometry depicted in FIG. 11. However, unlike reeling method that uses micromanipulator 140 and reeling fixture 170, the threading method might not use reeling fixture 170. The threading method may instead use solely the micromanipulator 140. The steps of one possible threading method are as follows. This outline is not necessarily limiting of the claimed inventions, and may be varied, such as described elsewhere herein.

1. Place winding saddles (not shown) in place by pushing halves together.
2. Place handling band 150 at bottom of carbon nanotube bundle 130 in starting slot.
3. Thread under saddle through spread link. Affix hold of handling band 150 at top of carbon nanotube bundle 130 and pass from left side of manipulator 140 to right side. If first link of chain, operation is the same except that there is no physical link to thread through.
4. Bring up and wrap around upper saddle, inserting one half or one quarter twist in orientation of the carbon nanotube bundle 130 as the carbon nanotube bundle 130 travels downward from the upper saddle.
5. Iterate steps 3 and 4 above until winding is complete.
6. Wind free end of carbon nanotube bundle 130 around straight side 22 of link 20. Remove handling band 152 at top, cut excess, and move handling band 152 away from link 20.
7. Disconnect handling band 150 at bottom from starting slot and wrap end around other straight side 22 of link.
8. Apply polymer to fix ends.

This process may be varied. For example, link 20 may be simultaneously wound by several parallel bundles 30. In other illustrative embodiments, nanofibers other than carbon fiber nanotubes may be threaded. For example, nanofibers made from silicon carbide fiber or boron nitride fiber could be wound using the above method.

The forming of link 20 may be used to measure average strength of carbon nanotubes grown in carbon nanotube forest 120. Fibers of carbon nanotube chain 10 may be run through a reactor to deposit a graphite layer around chain 10. Such layers may react with polymers from conventional composite work.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabrication of fibers using links of nanotubes, comprising:
   slicing a first nanotube rope from a nanotube forest;
   wrapping the first nanotube rope in a first plurality of circuitous turns to create a first link;
   slicing a second nanotube rope from the nanotube forest; and
   wrapping the second nanotube rope in a second plurality of circuitous turns to create a second link, wherein the second link is interconnected to the first link in a chain.

2. The method of claim 1, further comprising:
   slicing a third nanotube rope from the nanotube forest; and
   wrapping the third nanotube rope in a third plurality of circuitous turns to create a third link, wherein the third link is interconnected to the second link, and wherein the first link, the second link, and the third link are connected sequentially.

3. The method of claim 2, wherein the first nanotube rope, the second nanotube rope, and the third nanotube rope comprise bundles of carbon nanotubes grown in the nanotube forest.

4. The method of claim 3, wherein carbon nanotubes comprise one of single-wall carbon nanotubes and multi-wall carbon nanotubes.

5. The method of claim 2, wherein straight sections of the first link, the second link, and the third link are wrapped with one of additional nanotube ropes, and with free ends of the first nanotube rope, the second nanotube rope, and the third nanotube rope, respectively.

6. The method of claim 1, wherein wrapping of the second nanotube rope is completed by one of a reeling method and a threading method.

7. The method of claim 1, wherein slicing of the first nanotube rope and the second nanotube rope is completed by a micromanipulator.

8. The method of claim 1, wherein nanotube ropes alternatively comprise one of a silicon carbide fiber and a boron nitride fiber.

9. A system for fabrication of fibers using links of nanotubes, comprising:
   a micromanipulator configured to:
      cut an incision at a top of a nanotube forest to separate a first portion of a nanotube bundle from the nanotube forest,
      affix a first handling band around the first portion of the nanotube bundle,
      grip the first handling band and pull the nanotube bundle away from the nanotube forest,
      affix a second handling band around a second portion of the nanotube bundle, wherein the second handling band is about opposite the first handling band, and wherein the second portion is about opposite the first portion, and
      move the nanotube bundle to a winding station; and
   a reeling fixture of the winding station, wherein the reeling fixture is configured to receive the nanotube bundle, and wherein the reeling fixture is further configured to:
      position a first saddle inside a first closed nanotube link at a first end of the first closed nanotube link,
      affix a second end of the nanotube bundle to a starting slot of a second saddle, and
      rotate the nanotube bundle about the first saddle using the second saddle and a third saddle, wherein rotation creates a circuitous loop from the nanotube bundle, resulting in a second closed nanotube link, and wherein the second closed nanotube link is interlocked in a chain with the first closed nanotube link.

10. The system of claim 9, wherein the nanotube forest comprises carbon nanotubes.

11. The system of claim 9, wherein loose ends of the nanotube bundle are affixed to the second closed nanotube link using a polymer.

12. The system of claim 9, wherein the reeling fixture is further configured to produce a third closed nanotube link that is interlocked in the chain with one of the first closed nanotube link and the second closed nanotube link.

13. The system of claim 12, wherein the first closed nanotube link, the second closed nanotube link, and the third closed nanotube link are connected in a sequential manner.

14. The system of claim 9, wherein the reeling fixture comprises extendable and retractable arms configured to control the second saddle and the third saddle.

15. An object, comprising:
   a first nanotube rope wrapped in a first plurality of circuitous turns to create a first link; and
   a second nanotube rope wrapped in a second plurality of circuitous turns to create a second link, wherein the second link is interconnected to the first link in a chain.

16. The object of claim 15 further comprising:
   a third nanotube rope wrapped in a third plurality of circuitous turns to create a third link, wherein the third link is interconnected to the second link, and wherein the first link, the second link, and the third link are connected sequentially.

17. The object of claim 16, wherein the first nanotube rope, the second nanotube rope, and the third nanotube rope comprise bundles of carbon nanotubes grown in a nanotube forest.

18. The object of claim 17, wherein carbon nanotubes comprise one of single-wall carbon nanotubes and multi-wall carbon nanotubes.

19. The object of claim 16, wherein straight sections of the first link, the second link, and the third link are wrapped with one of additional nanotube ropes, and with free ends of the first nanotube rope, the second nanotube rope, and the third nanotube rope, respectively.

20. The object of claim 15, wherein nanotube ropes are twisted during creation of links.

\* \* \* \* \*